J. F. ERVIN.
Mold for Shaping Wax Comb-Guides for Hives.

No. 164,438.  Patented June 15, 1875.

WITNESSES:
A. F. Terry
Alex. H. Roberts

INVENTOR:
J. F. Ervin
BY Munn & Co.
ATTORNEYS.

THE GRAPHIC CO. PHOTO-LITH. 39 & 41 PARK PLACE, N.Y.

UNITED STATES PATENT OFFICE.

JOHN F. ERVIN, OF VINTON, IOWA.

IMPROVEMENT IN MOLDS FOR SHAPING WAX COMB-GUIDES FOR HIVES.

Specification forming part of Letters Patent No. 164,438, dated June 15, 1875; application filed April 10, 1875.

*To all whom it may concern:*

Be it known that I, JOHN F. ERVIN, of Vinton, Benton county, Iowa, have invented a new and useful Improvement in Wax Comb-Guides and Molds, of which the following is a specification:

This invention relates to a new and useful improvement in bee-hives, and consists in apparatus for making wax-guides for the bees to commence their work upon.

A represents the wax-guide, which is attached to the inside of the frame B on one or more of its sides. C is the mold in which the guides are made.

Figure 1:
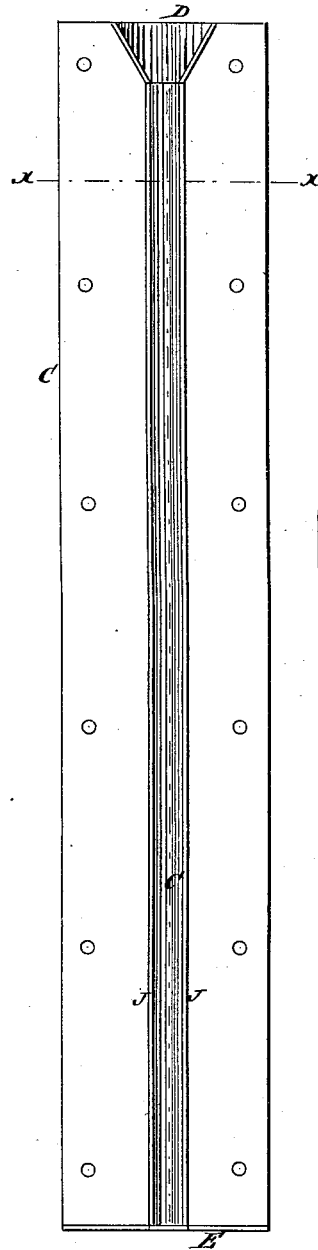
Figure 2:
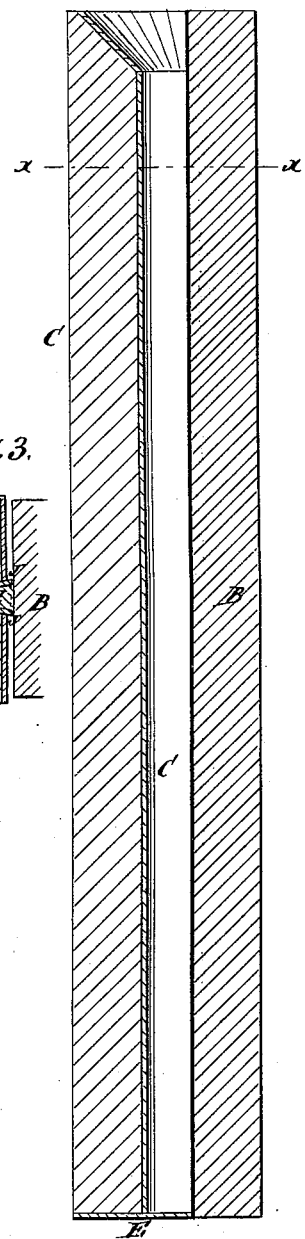

This mold is composed of tin or similar metal, fitted to a groove of triangular or conical form in a piece of wood. The metal extends out from the groove in each direction, as seen in Figure 1, which represents a face view. Fig. 2 is a longitudinal section, and Fig. 3 shows the mold, the guide, and the frame in cross-section, as taken through the lines $x\ x$, Figs. 1 and 2.

Similar letters of reference indicate corresponding parts.

Figure 3:
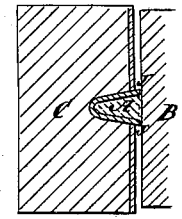

In forming the guides the mold is placed in contact with the inside of the frame, or of the parts of which the frame is made, substantially as seen in the cross-section, Fig. 3, and the melted wax is poured into the mold through the funnel D. The mold has a plate, E, across the lower end, which stops in wax, so that the mold fills, and the wax adheres to the frame or piece as the mold is withdrawn. The frames of a bee-hive provided with these guides will invariably induce the bees to commence their work upon them, and will make the bees attached to their hive. The mold C is made with projecting flanges J J, which allows it to meet the opposing frame (or piece) and make tight joints.

Having thus described my invention, I claim as new and desire to secure by Letters Patent—

The mold C, having funnel end D and end plate E, as and for the purpose specified.

JOHN F. ERVIN.

Witnesses:
    E. H. BOWEN,
    JAMES WOOD.